United States Patent

[11] 3,546,398

[72] Inventor Walter K. French
New York, New York

[21] Appl. No. 708,987
[22] Filed Feb. 28, 1968
[45] Patented Dec. 8, 1970

[73] Assignee Creative Systems, Inc.
New York, New York
a corporation of New York

[54] MAGNETIC TAPE HEAD WITH A MOVABLE POLE PIECE TO MAINTAIN A CONSTANT GAP
3 Claims, 4 Drawing Figs.

[52] U.S. Cl. .......... 179/100.2, 340/174.1
[51] Int. Cl. .......... G11b 5/24
[50] Field of Search .......... 179/100.2(C), 179/100.2(C), 100.2(CA); 340/174.1(F); 346/74(MC)

[56] References Cited

UNITED STATES PATENTS

| | | | |
|---|---|---|---|
| 3,370,282 | 2/1968 | Baldwin .......... | 340/174.1 |
| 2,656,420 | 10/1953 | Isberg .......... | 179/100.2 |

FOREIGN PATENTS

| | | | |
|---|---|---|---|
| 504,932 | 4/1939 | Great Britain .......... | 179/100.2 |
| 85,498 | 9/1956 | Netherlands .......... | 179/100.2 |

*Primary Examiner*—Bernard Konick
*Assistant Examiner*—Joci Rosenblatt
*Attorneys*—Mark T. Basseches and Paula T. Basseches

ABSTRACT: A magnetic tape head for magnetic recording, reproduction and obliteration or the like, comprising a pair of pole pieces having edge portions defining a gap, the separation of said pole pieces increasing at areas of said pole pieces progressively more remote from said gap and characterized by one said pole piece being movable and yieldably urged toward the other said pole piece, to maintain said gap essentially at a constant.

PATENTED DEC-8 1970 3,546,398

INVENTOR.
Walter K. French
BY Mark Bassecher
ATTORNEY

MAGNETIC TAPE HEAD WITH A MOVABLE POLE PIECE TO MAINTAIN A CONSTANT GAP

BACKGROUND OF THE INVENTION

1. Field of the Invention

This invention is in the field of magnetic recording, reproduction and obliteration. In the formation of magnetic tape heads, it is imperative that the gap dimension be carefully controlled. In order to secure proper response in the high frequency ranges without unduly high tape speeds, it is desirable that the gap dimension be maintained at or about 20 microinches or less. However, in conventional tape head devices, reduction in the gap dimension results in a tape head having certain undesirable characteristics.

Specifically, reduction of gap size in conventional tape heads results in a very high flux loss across the closely adjacent faces of the pole pieces, with the result that only a minor fraction of the flux generated is usefully imparted to the tape. In devices of this sort, a relatively high-input current is required to develop the desired flux concentration in the area of the tape.

In magnetic heads having larger gap spacings, flux loss across the opposed pole pieces is not as great but the recording of high frequencies, in view of the wide gap denomination, requires a high tape speed.

2. The Prior Art

Efforts have been made to achieve a high flux concentration in the tape while maintaining a small gap dimension, by limiting the opposed mass of the pole pieces in the area directly above the gap. It has been proposed, for example, to provide pole pieces which are cut away or tapered so that the gap defining edges are closer together than the areas of the pole pieces directly upwardly from the gap forming portions. While such devices do reduce the flux loss and concentrate the effective flux in the area of the tape, head life is greatly reduced since even moderate amounts of wear have been found to increase the gap size, because of the limited sectional thickness of the pole pieces in the area defining the gap.

Also, with such devices, even during the useful life of the heads, the gap size will vary constantly, resulting in a progressively varying frequency response and flux density in the tape area.

SUMMARY OF THE INVENTION

An improved magnetic tape head of the type described having relatively low flux loss and permitting the use of a narrow flux gap comprising at least one movable pole piece recessed in the area directly above the gap defining portions, to define a progressively increasing spacing from the other pole piece, thus to reduce the flux loss in the opposed areas of the pole pieces remote from the tape, the movable pole piece being urged toward the other pole piece, thus offsetting the natural tendency of the thinner sectioned, movable pole piece to wear by progressively advancing the movable pole piece toward the other pole piece.

Accordingly, it is an object of the invention to provide an improved magnetic tape head having small gap dimension and low flux loss.

A further object of the invention is the provision of a magnetic tape head having at least one movable pole piece urged toward the other pole piece, disparate wear of the pole pieces being compensated for by the progressive advancing movement of one pole piece toward the other.

A further object of the invention is the provision of a magnetic tape device including a tape drive and a magnetic head of the type described, wherein the feed friction of the tape augments the force with which the movable pole is urged toward the other pole piece.

To attain these objects and such further objects as may appear herein or be hereinafter pointed out, reference is made to the accompanying drawings, forming a part hereof, in which.

Figures 1, 2, 3, 4:
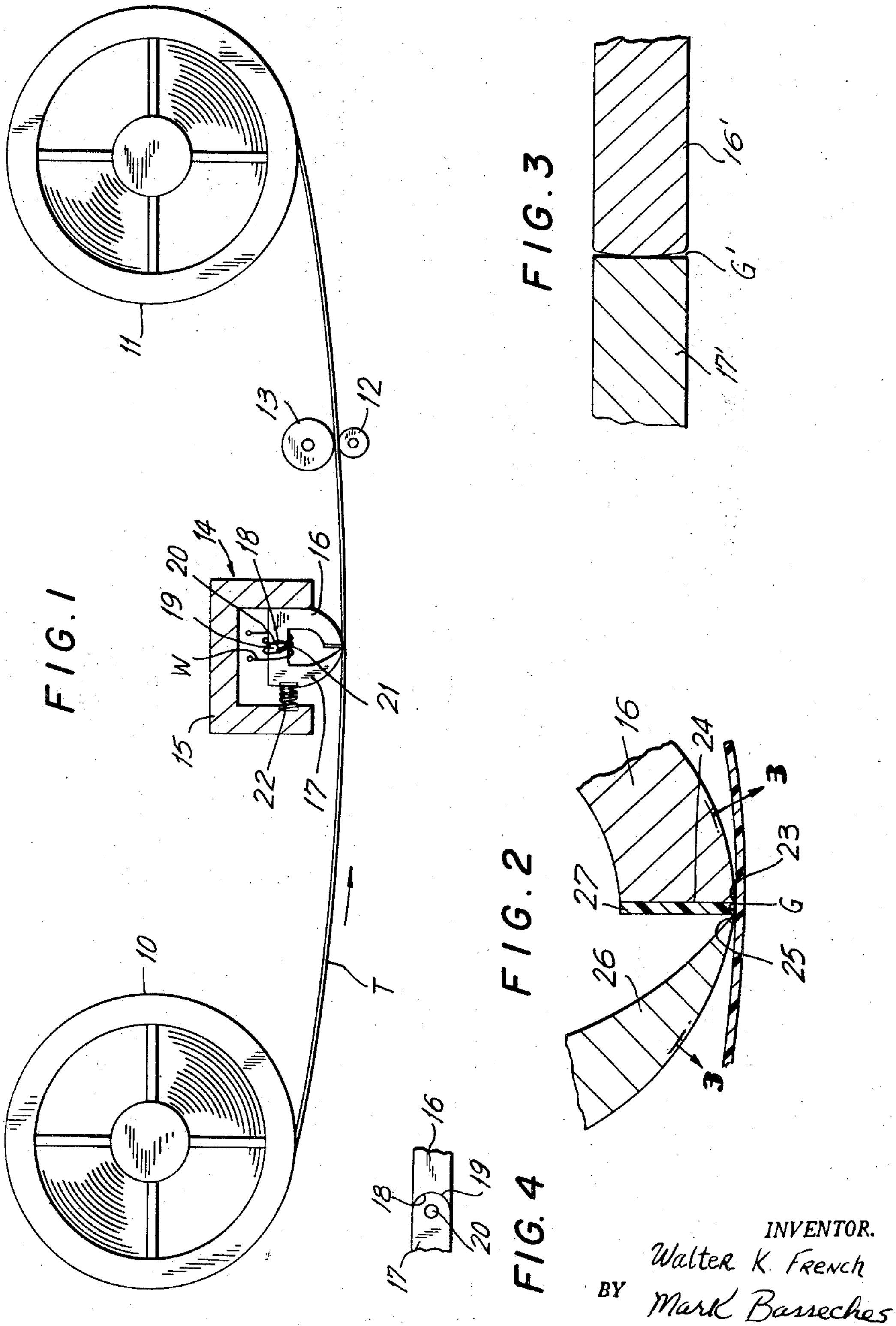
FIG. 1 is a diagrammatic side elevational view of a tape drive and tape head of the type described.
FIG. 2 is a magnified fragmentary section taken on the line 2–2 of FIG. 1.
FIG. 3 is a section taken on the line 3–3 of FIG. 2.
FIG. 4 is an enlarged view showing details of the junction between the fixed and movable pole pieces.

Referring now to to the drawings, in FIG. 1 there is diagrammatically shown a tape feed mechanism including a payoff reel 10, a takeup reel 11, and a drive capstan 12 pressing the tape against the usual idler roller 13. While one tape head assembly 14 is illustrated, it will be appreciated that, depending on the function of the magnetic tape device, two or more head assemblies may be employed.

The tape head assembly 14 includes a housing 15, within which is mounted a fixed pole piece 16 and a movable pole piece 17. The pole pieces may be formed of the usual high permeability metal and may be of laminated construction.

The fixed pole piece 16 incorporates a rearwardly directed cupped or concave portion 18. The movable pole piece 17 is provided with a complemental convex portion 19 which is nested within the concavity 18, the parts being preferably movably maintained in the noted relation by a pivot pin 20. It will be appreciated that the distal ends of the pivot pin 20 may be mounted in a bracket (not shown), the pin passing through an aperture 21 formed substantially centrally of the convex portion 19 of the pivotally movable pole piece 17—see FIG. 4.

Preferably a spring 22 is biased between the housing and the pole piece 17 and tends to urge the pole piece in an anticlockwise direction about the pivot pin 20.

As best seen in FIG. 2, the opposed edges of the lowermost ends of the pole pieces define the flux gap. Thus, the edge 23 of the end portion 24 of fixed pole piece 16 and the edge 25 of the end portion 26 of the movable pole piece 17 define a gap G. Optionally, a shim 27 is mounted on the rearwardly directed face or end portion 24 of the fixed pole piece, the thickness of the shin defining the dimension of the gap G.

Unlike the fixed pole piece 16, the movable pole piece 17 is recessed or tapered in the area directly above the gap defining edge 25 so that the pole pieces 16, 17 are spaced apart progressively greater distances in the areas directly above the gap G.

The head is provided with the usual winding W, diagrammatically illustrated in FIG. 1.

The operation of the device will be appreciated from the foregoing description.

In the usual manner, the tape T is fed in the direction of the arrows shown in FIG. 1 from the reel 10 to the reel 11 under the driving influence of the capstan 12 and idler roller 13. The tape is drawn across the tape head tangent to the gap G. Where the head is used as a recording or obliterating transducer, appropriate signals are fed to the winding W, resulting in the generation of a flux in the pole pieces.

The flux concentration for fringing flux at the gap area in a tape head of the present invention will bear a particularly high ratio to the overall flux, in contrast to known recording heads wherein a large proportion of the flux is lost or shunted between the juxtaposed masses of the pole pieces, and only a relatively small proportion of useful fringing flux is derived. This desirably high ratio is attributed to the absence of large opposed areas in the pole pieces adjacent the gap.

In contrast to other tape devices which have sought to increase the ratio by reducing the opposed pole piece area, the device of the present invention does not exhibit undesirable wear effects. The tape head wear in the present invention is compensated for by the ability of the pole piece 17 to advance in an anticlockwise direction under the influence of spring 22 (and under the influence of the drag of the tape) which tends constantly to urge the gap defining edge 23 of the pole piece 16.

If the thin sectioned pole piece 17 were not movably mounted, it would soon be worn away, to define a gap of progressively increasing width. However, the provision of a movable pole piece ensures a continuous compensation for any wear, to maintain the gap size at a constant dimension.

In FIG. 3 there is shown a construction in which no shim is interposed between the pole pieces 16', 17'. In this construction, the pole piece 16', rather than being flat, is slightly curved when viewed in horizontal section, so that the gap G' is not equal across its transverse dimension. This type of gap defining conformation has been found effective efficiently to reproduce a broad spectrum of frequencies.

Accordingly, in view of the low flux loss made possible by the present invention and the limited shunting area provided by the curved or arcuately configurated gap, it is possible in the present device, in some applications, to eliminate the shim member entirely.

It will be understood that the device of FIG. 3 is in all other respects similar to the embodiment shown in FIG. 2, i.e. it includes the pivotal pole piece recessed in the area directly above the gap defining head.

Where it is desired to use a nonflat mating set of pole pieces along the lines shown in FIG. 3, it is important that the pole piece avoid is thicker in vertical section, i.e. the fixed pole piece, have reduced horizontal section. This relationship tends to equalize the wear in the two pole pieces. In contrast, if the thinner sectioned, movable pole piece also were cut away or rounded at the gap defining edge, the disparate wear characteristics of the pole pieces would be accentuated.

It will be appreciated that the wear characteristics of the pole pieces will be affected by a number of factors. It may, for instance, in order to avoid disproportionate wear between the pole pieces, be desirable to augment the force exerted by a pressure pad against the fixed pole piece or in the area opposite the fixed pole piece. Likewise, the geometry of the tape feed direction may, to a degree, be employed as a means of equalizing wear. It is also possible to employ pole pieces having somewhat different wear characteristics, with the thinner sectioned, movable pole piece having a higher resistance to wear than the fixed pole piece.

Further design characteristics concern themselves with the arc or angle defined by the lower surface of the movable pole piece. Obviously this arc or angle must take into account the fact that over a period of time the pole piece will be progressively advanced in an anticlockwise direction. The angle of the under surface must, of course, be coordinated with the mating angle or pivot axis movable with respect to the fixed pole piece.

It is possible to eliminate the use of a pivot pin, such as the pin 20, and to so define the concave and convex curves of the mating parts of the pole pieces in such manner that the movable pole piece is bodily shifted downwardly toward the tape path with progressive wear, as by a cam interfit in the mating areas.

While, a pivotal movement of the pole piece has been illustrated, it will be readily recognized that a linear sliding movement or a compound movement may be devised to compensate for variations in gap dimension.

Many other variables will occur to those skilled in the art after they become acquainted with the present disclosure. Accordingly, the structure illustrated and described is not to be taken in a limitative sense but, rather, is to be broadly interpreted within the scope of the appended claims.

Obviously, as previously noted, the unit is not limited to use as a recording or obliterating head but, in normal manner, may be employed to induce a current within the winding W responsive to the passage of magnetized tape beyond the gap G.

Unlike prior devices which have attempted to increase fringing flux by reducing the thickness of the pole pieces in the area adjacent the gap, the device of the present invention does not suffer from short head life due to the employment of the novel, movable pole piece which progressively compensates for wear.

While the invention has been described and illustrated in conjunction with a single movable and a single fixed pole piece, it will be apparent that two movable pole pieces may be employed.

Also, while the device has been described in terms of a movable pole piece, it will be readily recognized that the major portion of the pole piece may be stationary, with movement being provided in the gap defining edge only. Thus, the term "pole piece" is to be interpreted to encompass such a construction.

I claim:

1. A magnetic tape device for magnetic recording, reproduction, obliteration or the like comprising means for advancing magnetic tape along a predetermined path, a first fixed pole piece including an end portion tangent to said path, said end portion terminating in an edge extending transversely of said path and facing the direction of feed of said tape, a second pole piece in leading position with respect to said first pole piece and including an end portion tangent to said path and including an edge extending transversely of said path and directed toward the edge of said first pole piece, said edges together defining a magnetic flux gap adjacent said tape path, said second pole piece being mounted for movement toward and away from said first pole piece, and spring means biasing said second pole piece toward said first pole piece, the edge of said second pole piece being thus urged toward the edge of said first pole piece by the combined forces of said spring means and frictional forces exerted by tape moving in said path against the end portion of said second pole piece.

2. A device in accordance with claim 1 wherein said second pole piece is recessed to define a clearance area between said pole pieces adjacent said gap defining edges, said edges forming the closest points of approach of said end portions.

3. A device in accordance with claim 2 and including a spacer shim member between said edges, whereby the dimension of said gap is a function of the thickness of said shim.